Oct. 28, 1952        A. C. REENTS        2,615,924
METHOD OF PURIFYING GLYCERIN
Filed Aug. 31, 1950
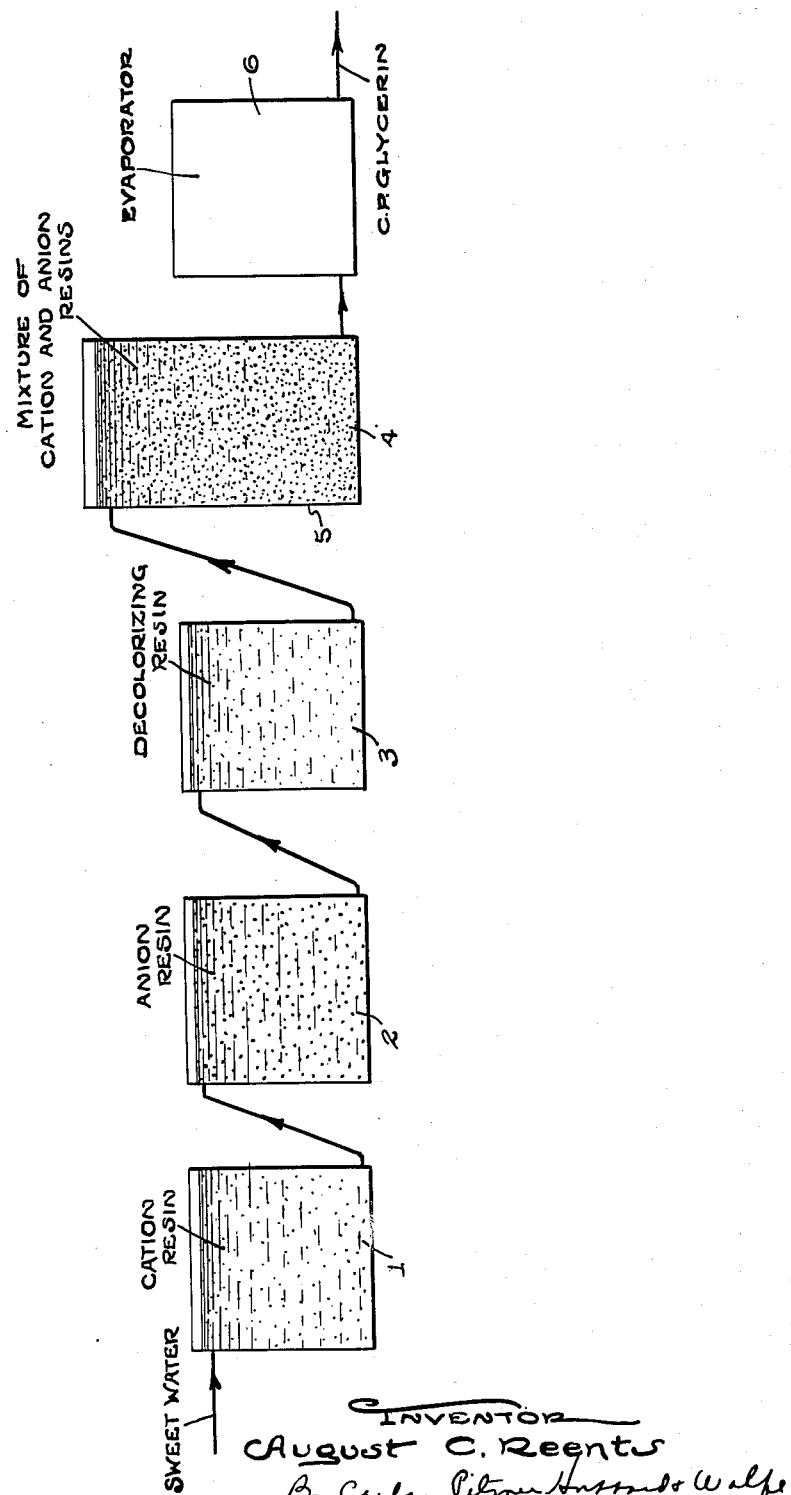
INVENTOR
August C. Reents
By Carlson, Pitzner Hubbard & Wolfe
ATTORNEY Patented Oct. 28, 1952

2,615,924

UNITED STATES PATENT OFFICE 2,615,924

METHOD OF PURIFYING GLYCERIN

August C. Reents, Rockford, Ill., assignor to Illinois Water Treatment Co., Rockford, Ill., a corporation of Illinois Application August 31, 1950, Serial No. 182,561

2 Claims. (Cl. 260—637)

Glycerin is now manufactured by a variety of methods, the most common being saponification of fats to produce soap and a by-product known as sweet water. The sweet water is concentrated to obtain so-called crude glycerin which may be distilled to obtain chemically pure glycerin. This process is not only prolonged and costly, but results in an objectionably low yield of glycerin capable of satisfying the U. S. Pharmacopoeia standards. For example, out of 1000 pounds of glycerin in the sweet water, only 700 pounds of c. p. quality are obtained by one distillation leaving 300 pounds of the so-called "dynamite" grade which may be redistilled with a resultant loss of 40 pounds which remain as the "foots." The cost of refining sweet water by the foregoing distillation method to produce chemically pure glycerin is about 2.8 cents per pound.

The general object of the present invention is to produce a greater yield of chemically pure glycerin without distillation and at a lower cost than has been possible heretofore.

As early as 1928 attempts were made to utilize ion exchange materials in the purification of glycerin. British Patent 633,343 issued to the American Cyanamid Company contemplates the purification of crude glycerin formed by the saponification of fats and oils without distillation by passing the sweet water through a succession of four pairs of cation and anion exchange beds. The cation exchange material recommended is a furfuryl acetone sulphonate reacted with furfural (Patent 2,373,233) while the anion material is a condensation product of formaldehyde or other aldehydes (British Patent 561,896).

While the effluent from the final exchanger in the above method is substantially colorless, the glycerin resulting from the subsequent concentration of this effluent is not water clear and is not salable as chemically pure glycerin. I have discovered that such failure of the effluent to remain colorless during the evaporation and concentration is due to the formation of discoloring compounds by reaction of the glycerin while heated with the minute amounts of weakly ionized fatty acids and salts thereof which are left in the effluent in spite of the repetition of the ion exchange process.

Based on the foregoing discovery, the present invention aims to modify the foregoing process so as to remove the cause of the discoloration of the effluent and thus enable chemically pure glycerin to be produced by ion exchange and without distillation.

A more detailed object is to effect a substantially complete removal of those weak organic acids which exist in the glycerin solution and which react adversely with the glycerin at the temperatures at which concentration of the effluent is effected.

Other objects and advantages of the invention will become apparent from the following description taken in connection with the accompanying drawing which is a diagrammatic representation of the steps in the improved process.

Generally stated, the improved process consists in a preliminary treatment of the crude glycerin solution with cation and anion exchange materials and, before final concentration of the solution by heating and evaporation, passing the same through a substantially homogeneous mixture of a cation exchange material and a strongly basic anion exchange material.

The improved process may be utilized to treat the so-called sweet water which usually contains 5 to 15 per cent of glycerin or crude glycerin after dilution of the latter preferably to a concentration of less than 30 per cent. If the solution is turbid due to the presence of colloidal matter, it is first clarified by the addition of lime and in some instances alum, raising the pH value to about 9.5. After filtering, the solution is passed through cation and anion exchange materials which, for optimum economy in operation, are preferably arranged in separate beds 1 and 2 connected in series. While various kinds of cation exchange resins may be employed, I prefer to use an insoluble sulphonated polymerizate of a mixture of a polyvinyl aryl compound such as divinyl benzene and a mono-vinyl aryl compound such as styrene (vinyl benzene). Such resins are sold under the trade designations of Dowex-50 (Dow Chemical Company) and Amberlite-IR 120 (Resinous Products Division of Rohm & Haas Company) and may be regenerated in a well known manner with a dilute solution of a mineral acid.

Various anion exchange resins may be employed one preferred example of which is a porous aminated phenol formaldehyde condensation product sold by Chemical Process Company under the trade designation of Duolite A-7. Such resins are regenerable with soda ash, ammonium hydroxide or sodium hydroxide and are known as weakly basic in view of their strong affinity for removing strong mineral acids.

After contact with the cation and anion exchange beds 1 and 2, the effluent, which usually is light amber color, is passed through a bed 3 of a porous resin which comprises an unaminated condensation product of phenol and formaldehyde. This resin may be reactivated from time to time by first contacting it with a sodium hydroxide solution (about 4 per cent) and, after rinsing out the alkali, passing a dilute solution (about 2 per cent) of sulphuric acid through the bed. The glycerin solution is further decolorized by this treatment and comes out of the bed 3 nearly water white.

At this time and in spite of its clarity, I have found that the solution contains certain complex weak organic acids particularly fatty acids and salts thereof such for example as butyrates which, when heated in the presence of glycerin at the temperatures used in concentrating the glycerin solution react therewith to form complex organic bodies that discolor the concentrated glycerin and render the same unsalable as the chemically pure grade.

In accordance with the present invention such discoloring as an incident to subsequent concentration of the glycerin solution by evaporation is avoided by a further ion exchange treatment to remove substantially all of the objectionable fatty acids and their salts. This is accomplished by the use of a particular kind of anion exchange material under conditions which effect the complete removal of all weakly ionizable organic acids. To produce an action equivalent to a large number of pairs of serially arranged cation and anion exchangers, the anion material is mixed homogeneously with the cation exchange material to produce a single bed 4 through which the effluent from the bed 3 is passed.

The anion exchange resin in the mixed bed is strongly basic and has a great affinity for the weak organic acids remaining in the glycerin solution or produced therein by the reaction of the cation exchange resin of the mixed bed with fatty acid salts that remain in the effluent from the bed 3. An example of such a strongly basic anion exchange resin is quaternized styrene divinyl benzene containing a quaternary ammonium grouping such as Dowex-2 sold by Dow Chemical Company and Amberlite-IRA-400 sold by Resinous Products Division of Rohm & Haas Company. Such resins are regenerable with a solution of sodium hydroxide.

As the cation exchange material in the mixed bed, a strongly acid type of resin material should be employed having a density which differs sufficiently from that of the anion-resin. One example of a suitable cation resin is the styrene type above referred to and used to form the bed 1.

The cation and anion exchange resins of the bed 4 being of different densities may be separated within or outside of the tank 5 in a manner well known in the art.

The final step in the purification process is to concentrate the effluent from the bed 4. This is accomplished under vacuum in an evaporator 6 of well known construction. Since the fatty acids or other impurities which would react with the glycerin at the evaporating temperature have been removed completely in the manner described above, the final concentrated glycerin is water-clear and satisfies the U. S. Pharmacopoeia standards for chemically pure glycerin. Actually, it is superior to the c. p. glycerin produced by distillation because it remains colorless after prolonged exposure to sunlight, whereas distilled glycerin becomes discolored under such conditions.

With the improved process, the recovery of the glycerin, all of c. p. quality, is substantially 100 per cent and the total cost of refining sweet water containing 15 per cent glycerin and 0.2 per cent ash is about 0.46 cent per pound of c. p. glycerin. This compares with 2.8 cents per pound with the distillation method.

I claim as my invention:

1. The method of purifying glycerin solution which includes the steps of contacting the solution with cation and anion exchange materials and thereafter passing the effluent through a body comprising a substantially homogeneous mixture of a cation exchange material and a strongly basic anion exchange material comprising a quaternized polymerization product of styrene and divinyl benzene containing an ammonium group.

2. The method of purifying glycerin solution which includes the steps of contacting the solution with cation and anion exchange materials and thereafter passing the effluent through a single body comprising an intimate mixture of a cation exchange material and a strongly basic anion exchange material which has a strong affinity for weakly ionizable organic acids.

AUGUST C. REENTS.

REFERENCES CITED

The following references are of record in the file of this patent:

UNITED STATES PATENTS

| Number | Name | Date |
|---|---|---|
| 2,461,505 | Daniel | Feb. 15, 1949 |
| 2,463,677 | Brandner | Mar. 8, 1949 |
| 2,515,142 | Strob | July 11, 1950 |
| 2,515,581 | Appelquest | July 18, 1950 |

FOREIGN PATENTS

| Number | Country | Date |
|---|---|---|
| 633,343 | Great Britain | Dec. 12, 1949 |

OTHER REFERENCES

Chemical and Engineering News, July 12, 1948, p. 2081.

Chemical Engineering, Feb. 1950, pp. 162 and 163.

Chemical and Engineering News, Sept. 26, 1949, inside back cover.